US012811468B2

(12) United States Patent
Crews

(10) Patent No.: US 12,811,468 B2
(45) Date of Patent: Nov. 24, 2026

(54) ELECTRIC VEHICLE THAT IMPLEMENTS AN ON-BOARD ELECTRICITY GENERATOR WITH MANUAL START CYCLE ASSIST

(71) Applicant: Eric Jason Crews, Blacksburg, VA (US)

(72) Inventor: Eric Jason Crews, Blacksburg, VA (US)

(*) Notice: Subject to any disclaimer, the term of this patent is extended or adjusted under 35 U.S.C. 154(b) by 286 days.

(21) Appl. No.: 18/743,410

(22) Filed: Jun. 14, 2024

(65) Prior Publication Data

US 2025/0047168 A1 Feb. 6, 2025

Related U.S. Application Data

(60) Provisional application No. 63/517,648, filed on Aug. 4, 2023.

(51) Int. Cl.
*H02K 7/18* (2006.01)
*B60L 50/10* (2019.01)

(52) U.S. Cl.
CPC ............ *H02K 7/1853* (2013.01); *B60L 50/10* (2019.02)

(58) Field of Classification Search
CPC .............................. H02K 7/1853; B60L 50/10
See application file for complete search history.

(56) References Cited

U.S. PATENT DOCUMENTS 5,606,233 A 2/1997 Davis
6,054,838 A 4/2000 Tsatsis
7,140,459 B2 11/2006 Shimizu
7,374,000 B2 5/2008 Yamamoto et al.
7,427,849 B2 9/2008 Kaneko et al.
8,561,747 B2 10/2013 Domes
9,163,507 B2 10/2015 Domes
10,797,627 B2 10/2020 Wu
11,220,189 B1 1/2022 Hogan
2003/0135313 A1* 7/2003 Bruck ..................... H02J 9/002 123/322
2004/0189008 A1 9/2004 Tsatsis
2006/0202582 A1 9/2006 Umesaki et al.
2007/0284886 A1 12/2007 Jhang
2010/0307847 A1 12/2010 Lungu et al.
2011/0049899 A1 3/2011 Hoffman
2013/0332014 A1 12/2013 Jackson
2014/0125059 A1 5/2014 Chen
2015/0330377 A1* 11/2015 Wang ...................... F04B 33/00 417/374
2020/0148208 A1* 5/2020 Choi ............... B60W 30/18127
2021/0188241 A1 6/2021 Kikuchi et al.
2023/0387534 A1* 11/2023 Weinberger ............... B25F 1/00

* cited by examiner

*Primary Examiner* — Edwin A Young

(74) *Attorney, Agent, or Firm* — Dunlap Bennett & Ludwig PLLC

(57) ABSTRACT

An electric vehicle activation system provides at least one hand-manipulated lever pneumatically associated with a permanent magnet magneto generator for generating a start current electrically coupled to a generator system of the electric vehicle. The manipulation of each hand-manipulated lever enables air pressure to activate a pneumatic impeller causing a hydraulic draft cycle configured to generate the start current.

11 Claims, 6 Drawing Sheets

ELECTRIC VEHICLE THAT IMPLEMENTS AN ON-BOARD ELECTRICITY GENERATOR WITH MANUAL START CYCLE ASSIST

CROSS-REFERENCE TO RELATED APPLICATION

This application claims the benefit of priority of U.S. provisional application No. 63/517,648, filed Aug. 4, 2023, the contents of which are herein incorporated by reference.

BACKGROUND OF THE INVENTION

The present invention relates to electric vehicles and, more particularly, an electric vehicle that implements an on-board electricity generator with manual start cycle assist.

Currently, electric vehicles that use electricity storage batteries have problems with the dearth of charging stations. Furthermore, electricity storage batteries of electric vehicles can catch fire, wherein the fire can be more difficult to extinguish than fires in gas-powered cars. They can burn hotter, up to 5,000 °F, and can reignite days or weeks after they seem to be out.

As can be seen, there is a need for an electric vehicle that solves the electric vehicle charging problem as it does not require an electricity storage battery. The electric vehicle embodied in the present invention implements an on-board electricity generator with manual start cycle assist, thereby obviating the above-mentioned electric vehicle storage problem and, as such, avoiding the fire problem.

SUMMARY OF THE INVENTION

In one aspect of the present invention, an electric vehicle activation system providing at least one hand-manipulated lever pneumatically associated with a permanent magnet magneto generator for generating a start current electrically coupled to a generator system of the electric vehicle.

In another aspect of the present invention, the electric vehicle activation system, wherein the at least one hand-manipulated lever comprises one hand-manipulated lever on each side of a driver's seat of the electric vehicle, wherein manipulation of each hand-manipulated lever enables air pressure to activate a pneumatic impeller causing a hydraulic draft cycle configured to generate the start current; further providing a control circuitry electrically coupled to the hydraulic draft cycle and the generator system of the electric vehicle, the control circuitry configured, to re-introduce the start current into said generator system until the latter produces a stable load resistance, wherein the permanent magnet magneto generator comprises a sum of two counter-rotating permanent magnet magnetos configured to harvest angular momentum of the permanent magnet magneto generator in rotative motion, wherein the hydraulic draft cycle pneumatically pressurizes hydraulic fluid while pressurizing a gear incline tilt to yield usable levels of electrical current for driving the electric vehicle; and further providing a systemic oil flow configured to actuate a hydraulic impeller rotating a drive chain assembly of the electric vehicle.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides an electric vehicle activation system provides at least one hand-manipulated lever pneumatically associated with a permanent magnet magneto generator for generating a start current electrically coupled to a generator system of the electric vehicle. The manipulation of each hand-manipulated lever enables air pressure to activate a pneumatic impeller causing a hydraulic draft cycle configured to generate the start current.

Figure 1:
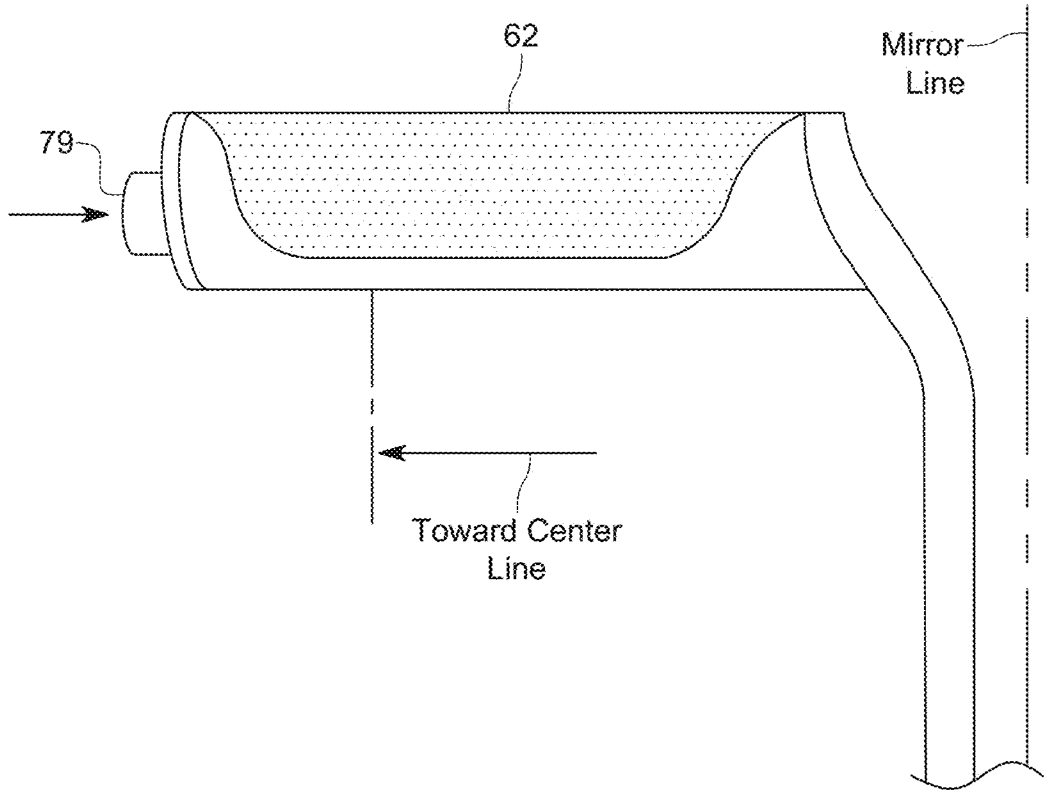
FIG. 1 is a detailed elevation view of a draft cycle "start" system manual actuation element of an exemplary embodiment of the present invention.
Figure 2:
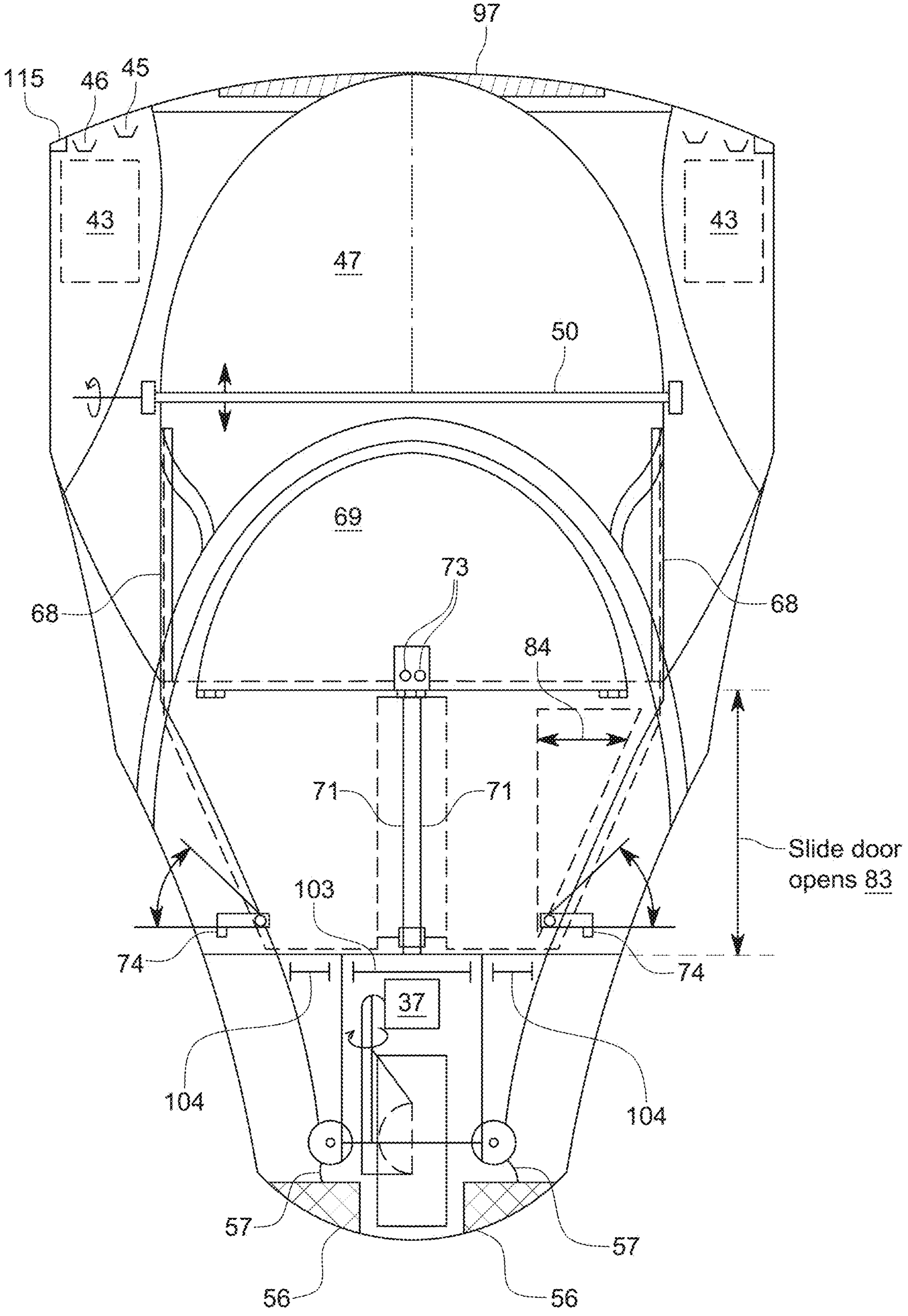
FIG. 2 is an elevation view of an exemplary embodiment of the present invention.
Figure 3:
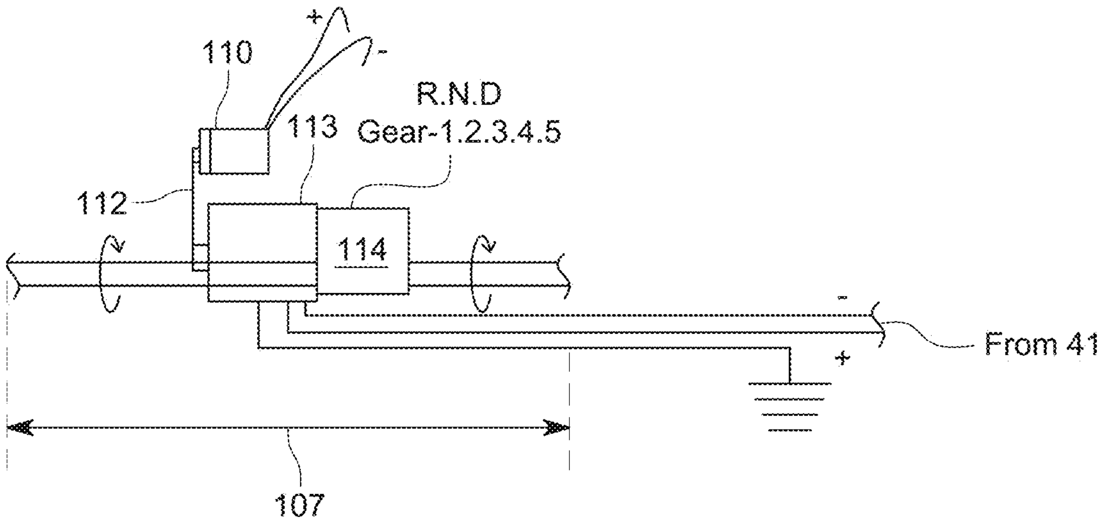
FIG. 3 is a detailed elevation view of an automatic automotive transmission of an exemplary embodiment of the present invention.
Figure 4:
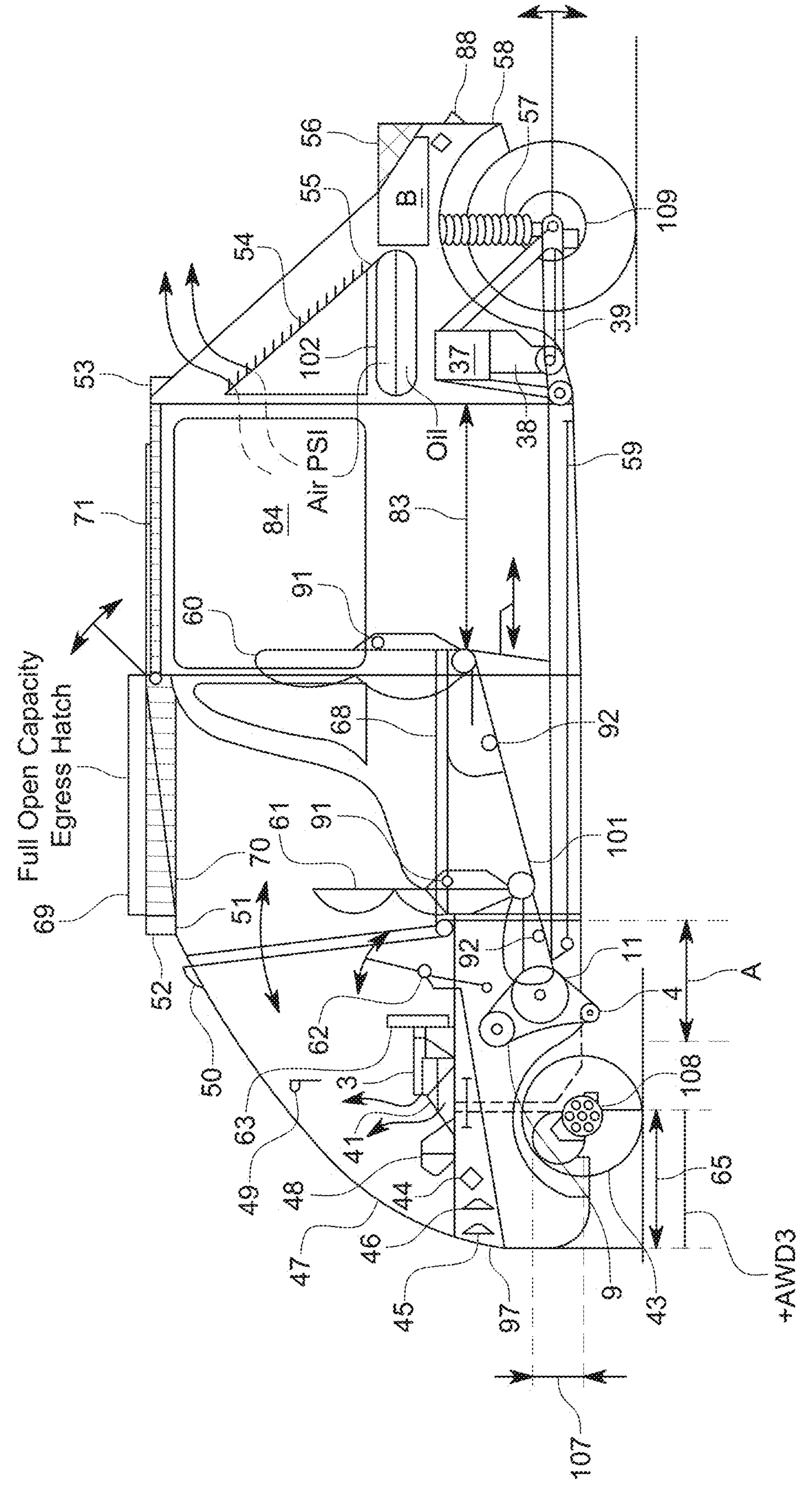
FIG. 4 is a section view of an exemplary embodiment of the present invention.
Figure 5:
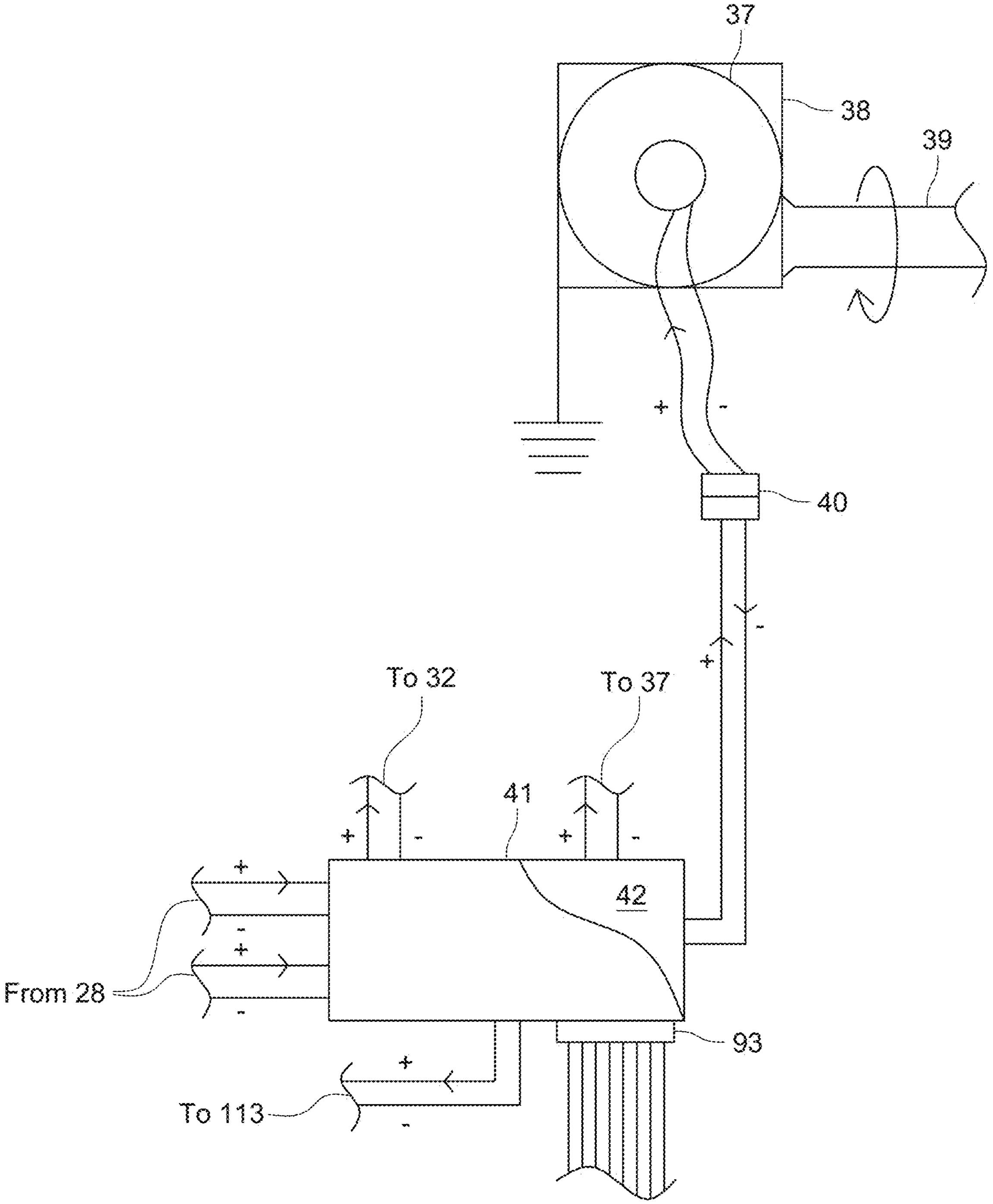
FIG. 5 is a detailed elevation view of an electro-magnetic pulse inductance shield of an exemplary embodiment of the present invention.
Figure 6:
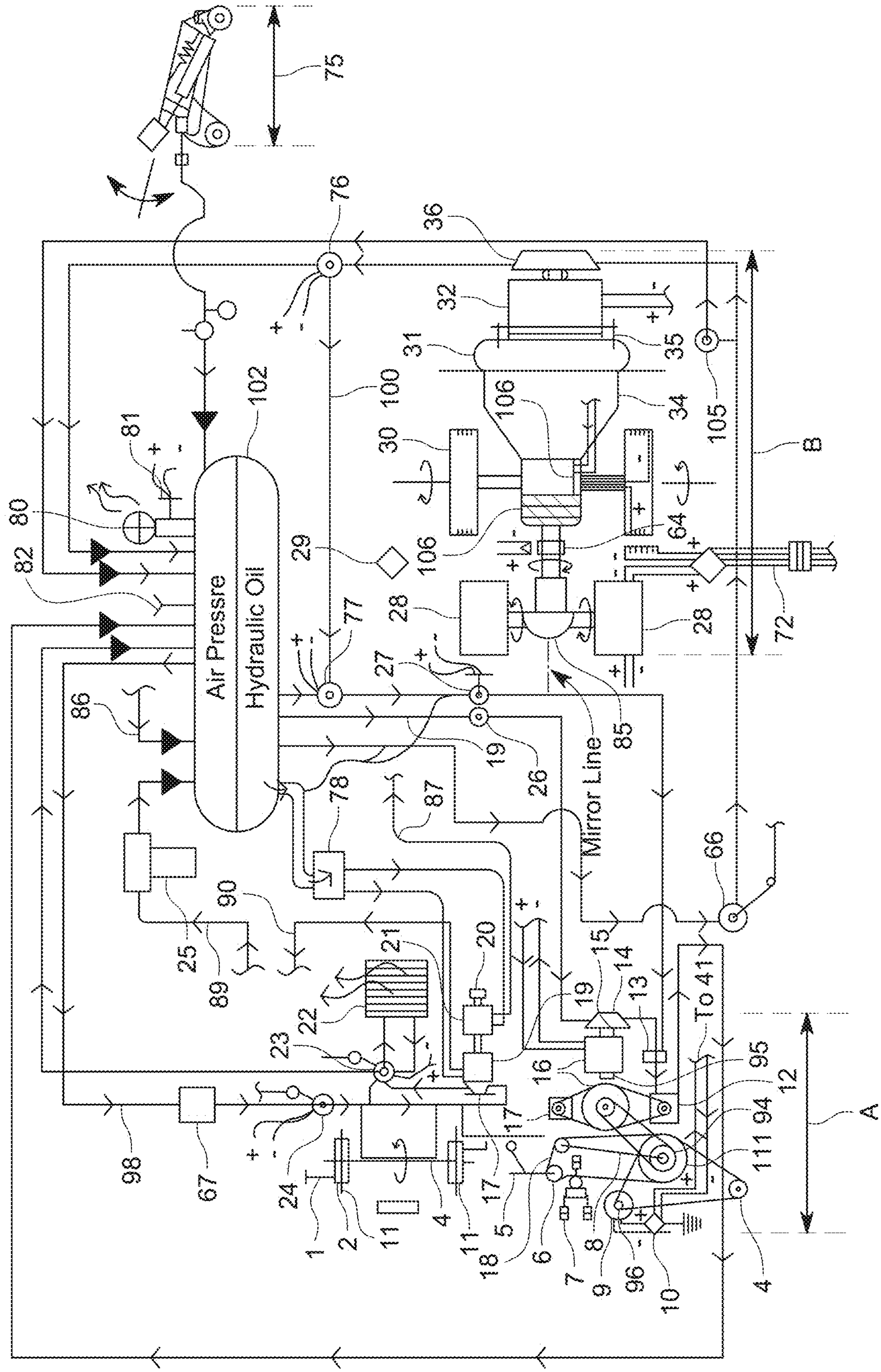
FIG. 6 is a schematic view of an exemplary embodiment of the present invention.

Referring now to FIGS. 1 through 6, the present invention may include an electric vehicle having the following systemic components:

1. hand-operated lever for actuating an electricity-producing hydraulic draft cycle
2. drive chain system
3. car cab internal air discharge vents-interior defog vent
4. under carriage tandem connection bar assembly (weather encased bearing supported)
5. ergonomic adjustment swivel for comfort
6. ratchet sprocket gear (once manual actuation has been incurred the "ratchet gear" will allow the drive chain assembly to continue to rotate while the manual hand lever then remains stationary)
7. drive chain tension expansion spring (sprocket tension mounting system)
8. sprocket assembly chassis mounting "frame"/bracket
9. magneto electricity permanent magnet generator (an electricity generator upon the hydraulic draft cycle system including the sprocket and drive chain system 94)
10. voltage regulator
11. main multi sprocket assembly
12. sprocket and drive chain driven high speed hydraulic oil fluid pump
13. system oil flow switch valve electric valve circuit controlled electric valve
14. hydraulic impeller
15. electrical ground point
16. electric motor speed control circuit
17. sprocket and drive chain driven assembly may include a pneumatic impeller (centrifugal type impeller "start" pressure assistance), power steering and power brake pumps and revolutions per minute sensor (R.P.M. sensor) that reports to the cars logic "mapping" electronic circuits to control and maintain the draft accelerator, speed and correct valve positions.

18. drive chain system (all sprockets are connected—i.e. "driven"—by connecting drive chains)

19. power steering pump—pneumatic impeller (centrifugal type with electric solenoid slider piston type air compression unit). The drive chain sprocket "air repack" pathway contains solenoid causing oscillating air compression piston so that the "slide piston compresses" air with the solenoid then causing horizontal motion of the core piston the exhaust pressure from both sides of the piston chamber implements a one-way valve. The intake air the derived from the centrifugal compressor. The exhaust air is then directed to the dual component pressure storage tank 102.

20. R.P.M. sensor

21. power brake pump

22. air intake and or exhaust filter (direction of flow) determined by flow cycle valve default position to vent exhaust-stored air flow to allow for the "start" pressure to vent—manual selection switch changes air filter flow direction to "re-pressurize" the dual component pressure storage tank with air pressure for subsequent system "re-start".

23. pneumatic flow direction valve

24. pneumatic "start" valve—actuation button upon the manual hand lever 1

25. oil filter

26. hydraulic draft cycle "start valve" internal coil spring biased in a "closed position" (yet will not cause a fluid "lock", a safety feature to "restrict" oil flow) whereby an electrical function of the valve is configured to cause the valve to move to the "open position" when valve's solenoid is energized

27. oil pressure sensor "reports" to the logic electronic circuit system to "govern" the system parameters for correct/safe functioning

28. main high voltage electricity generator

29. variable voltage regulator

30. compound magneto electricity generator ("compound magneto" including a permanent magnet magneto whose electromagnets may allow for variable magnetic intensity to yield higher electrical output) aft mounted upon the main high voltage electricity generator 28

31. automotive torque converter

32. assembly electric drive motor (10 Hp-20 Hp) Hp=Horsepower

33. through bore electricity transfer slip ring-transfers variable current to the magneto's permanent magnets coils wound electromagnets

34. automotive multi speed automatic transmission

35. electric to torque converted mounting bolt plate

36. dual function hydraulic pump/centrifugal impeller

37. rear electric drive motor

38. automotive automatic transmission (wheel connection by drive shaft and wheel gear assembly)

39. drive shaft

40. wire bus connector

41. electricity management logic electronics, wherein power management unit "connects via wire all generator, motor system and other electrical automotive functions that "govern" output electricity for the automobile, and houses the electronic "mapping logic electronic circuit" via "multi wire/ribbon wire", logic bus 93 including information sent to the driver's dashboard control switches.

42. electro-magnetic pulse inductance shield encasement

43. front tire

44. side marker lamp

45. high beam automotive head lamp

46. low beam automotive head lamp

47. canopy style windshield safety glass

48. electric motor positioned side view mirrors "both sides" left and right

49. internal sun visor mount rear view mirror mount

50. flex—bar windshield wiper combination "forced air "hot or cold" rain displacement system pressurized air will eject from the "bar" in an "upward" fashion to deflect rain or snow.

51. air flow safety "grill" prevents objects from entry into the vehicle cab yet allows air flow

52. high beam lamp system

53. rear running/running/brake lamp assembly (red translucent plastic)

54. cab vent system allows for cab internal air flow discharge

55. oil fill valve (like a fuel flap upon the automotive "body")

56. rear lamp assembly rear "running" lamp and brake lamp housing (e.g., colored translucent plastic), market lamp and turn signal lamp assembly

57. rear strut wheel suspension system sum of two mounted upon each side of the wheel "swing arm"

58. rear license plate and lamp assembly

59. pneumatic hydraulic fluid assist chair block assembly slide rack system-when opening the door, the chair assemble will retract toward the rear of the vehicle and when instigated by the driver/operator, the seat system will slide toward the front of the vehicle locking the seat assembly in place by secure lock system that is also safety checked by seat belt in place safety circuit

60. elevated rear passenger seat

61. driver's seat

62. draft cycle "start" system operatively associated with the manual actuation levers which may be the sum of two-one upon each side of the driver's seat

63. steering wheel

64. R.P.M. sensor

65. car's electric H.V.A.C. system (heating ventilation and air conditioning system "bay")

66. oil flow valve

67. pneumatic pressure regulator

68. slide door guide rail/door guide track

69. sunroof tinted safety glass (multi color translucent for "color" the interior).

70. sunroof internal latch allows gradient position or full egress open latch redundant safety lever to prevent unwanted full lid open.

71. internal door guide rail "top rail"/door guide rack track

72. multi wire/ribbon wire—for variable current to the voltage regulator—contains fault indication circuit ensuring the voltage regulator is operating correctly

73. roller wheel door guide system pushed outward by expansion coil spring system fixed mounting position

74. door handle—lock position determines if seat slide system is required

75. manual foot operated air pump, stowable upon the right side of the driver in compartment for filling the rear air pressure oil pressure tank with air manually

76. first oil flow valve electric actuation logic controlled by electronic circuit

77. second oil flow valve electric actuation logic controlled by electronic circuit

78. oil flow "block", providing pressure sensors reporting to the car's safety circuits multi-port oil flow union coupling
79. "start" sequence pneumatic pressure release button—allows air pressure to activate a pneumatic impeller causing draft cycle rotation
80. dual component pressure storage tank over pressure safety valve—vents pressure tank pneumatic over pressure for system safety
81. dual component pressure tank (air pressure causes oil pressure) pressure level sensor
82. pneumatic one-way fill valve
83. automotive door providing a slide arch—which in some embodiments, may be the sum of two each side of the vehicle—wherein the front slide "impact arch" an arch shape that slides toward the rear of the vehicle with increased "side impact protection" as the underfloor cavitation/compartment containing "rivet union joined" horizontal metal support members to "exceed" current side impact protection that move tandem with the front slide door. The "front" slide arch is adapted to cause the seat block to slide toward the rear of the vehicle, then the seat block returns to the "drive" position via pneumatically pressurized hydraulics with flow rate limiter for slow smooth hydraulic piston actuation. The "slide arch" acts as a vehicle safety "roll bar".
84. door window both doors
85. automotive differential
86. oil return pipe from power brake
87. oil flow, sent to oil pressure distributor and coil spring retained foot pedal actuation lever for activating all power brake calipers, wherein return oil flow may be compressed via a slide piston to then returned to the dual component pressure tank via oil return pipe 86
88. license plate lamp
89. power steering oil return pipe
90. power steering oil send
91. first five-point seat safety harness mounting point
92. second five-point seat safety harness mounting point
93. logic "ribbon wire" multi wire bus connects systems sensors, lamps, blower fans, H.V.A.C systems to the logic processor electronic circuits for vehicle component correct operation.
94. sprocket and drive chain system
95. sprocket and drive chain system
96. permanent magnet magneto (an electricity generator upon the hydraulic draft cycle system including the sprocket and drive chain system 94)
97. vehicle "grill" mounts the H.V.A.C. refrigeration condenser that accommodates an electric blower fan to cool the refrigeration condenser
98. pneumatic flow pipe/pressure rated "hose"
99. oil flow pipes
100. oil flow "high cycle" oil flow pipe
101. seat slide mounting system
102. dual component pressure storage pressure tank
103. rear window
104. rear window
105. oil by-pass valve a safety valve
106. electricity actuated mechanical clutch assembly engages the "high range"
electricity producing generators
107. forward electric motor and transaxle (automotive automatic transmission) assembly
108. front wheel disk brake assembly
109. dual disk rear brake assembly
110. Alternator 12 v (powers car lighting radio horn . . . etc.)
111. large sprocket
112. drive belt
113. main dual shaft electric motor
114. automotive automatic automotive transmission
115. turn signal marker lamp
116. door handle key lock assembly
Letter "A"=draft cycle requiring manual start.
Letter "B"=high speed main electrical production unit configured with "cross-over" electrical enabling both letter "A" to work in tandem with Letter "B"

The present invention enables an electric vehicle with a manual "start system" that implements a two-lever pneumatic assist system to cause the initial system to start electrical current from the permanent magnet magneto. The two-lever system is hand operated with ratchet gearing so that the "spin" can continue to rotate the drive-chain-driven components with the levers idle once rotational inertia has been attained. The produced electrical current from label letter "A" is then directed to the electricity management logic electronics 41, where the electrical current is then directed by wire to assembly electric drive motor 32, an electric motor, causing rotation of the multi speed automatic transmission 34 via the torque converter assembly 31.

The rotational output to the mass weight of the compound magneto electricity generator 30 (which is the sum of two, counter rotating magneto permanent magnet magnetos) causes high inertia "mass in motion" allowing for the harvest of angular momentum to yield higher levels of electrical current that in turn is "re-introduced" back to the electric motor's speed control circuit 16 and assembly electric drive motor 32, increasing generator systems speed, yielding higher electricity generation levels. With the electric clutch engaged for electricity actuated mechanical clutch assembly 106, the main generator 28 then produces sufficient electrical current for rear electric drive motor 37 and the front wheel electric drive motor 113) to propel the automobile at highway speeds sustained safely. The design will operate as a "normal" car would i.e., key lock ignition and in lieu of a fuel delivery foot pedal, the car's throttle will then use a potentiometer/variable resistor to increase/decrease the electricity to the drive electric motors that propel the car. The vehicle uses a disk brake and caliper system.

Generally, the vehicle's manual start cycle causes the generator system to produce electricity that is applied to the main generator system 28. The main e-generator 28 powers a hydraulic draft effect system using pneumatically pressurized hydraulic fluid while pressurizing a gear incline "tilt"/gear increase to yield usable levels of electrical current for driving the electric motors that move the automobile.

Specifically, the manual "start system" implements a two-lever pneumatic assist system configures to generate a start electrical current from the permanent magnet magneto 96 while the oil flow system's valves allow oil pressure to actuate the hydraulic impeller causing the drive chain assembly to rotate.

The two-lever "oil draft" system is hand operated with ratchet gearing so that the "spin" can continue to rotate the drive-chain-driven components with the levers idle once rotational inertia has been attained producing fluid suction advancing the electricity generator system Letter "B" due to fluid suction produced by high-speed oil pump.

The electrical current produced from label letter "A" is directed to the electricity management logic electronics 41, where the electrical current is then directed by wire to assembly electric drive motor 32, an electric motor, causing rotation of the multi speed automatic transmission 34 via torque converter assembly 31.

Air pressure causes oil pressure yielding cyclical work potential within the cycle. The work potential is used and retained due to the phase states of matter. Air pressure "flexes" and oil acts as a solid.

Having the drive impeller preceding the high-speed oil pump causes mechanical advancement of the "hydraulic draft cycle" yielding electricity production able to be "re-introduced" back into the system' electric motor control circuitry 16, increasing system speed until the main electrical generator 28, assembly "Letter B" produces stable "Baug resistant/load resistant" (i.e., the generator will not slow down when an electrical "load" is placed upon the main generator wherein percent of produced electricity is simultaneously increased to the electric drive motor of the generator with the "potential obtained from the cyclical "stored" air pressure level), "power ban", and electricity production at required levels to motivate the automobile.

Fluid suction speed advancement with the "work potential" used and retained as air pressure that pressurizes the oil.

The rotational output to the compound magneto electricity generator 30 enables high inertia "mass in motion" allowing for the harvest of angular momentum to yield higher levels of electrical current then "re-introduced" back to the electric motors' control circuitry 16 and assembly electric drive motor 32, increasing generator systems speed, yielding higher electricity generation levels.

With the electric clutch engaged for the electricity actuated mechanical clutch assembly 106, the main generator 28 then producing sufficient electrical current for the rear electric drive motor 37 and the front wheel electric drive motor 113 to propel the automobile at highway speeds sustained safely.

The design will operate as a "normal" car would i.e.— have key lock ignition and in lieu of a fuel delivery foot pedal, the car's throttle will then use a potentiometer/variable resistor to increase/decrease the electricity to the drive electric motors that propel the car. The vehicle uses three disk brake and caliper system. Driver controls may also be in standard format. The car accelerator foot pedal (potentiometer) foot pedal brake lever, turn signal with bright light function, wind screen/wind shield wiper-air blower system control lever (steering column). Manual window control cranks.

The electric vehicle's generator system can change electrical output. The logic mapping electronic circuits then "governs" the generator's speed and flow cycle for correct functioning. Correct service parameter to replace the internal combustion engine system superior to electric vehicle plug in type electric vehicle.

Additionally, the present invention enables power system application maritime, agriculture "farm equipment" water purification, electrical power for manufacturing, and it can create electricity while providing work, which would be a boon to innumerable fields.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. An electric vehicle activation system comprising:

at least one hand-manipulated lever pneumatically associated with a permanent magnet magneto generator for generating a start current electrically coupled to a generator system of the electric vehicle, wherein the at least one hand-manipulated lever comprises one hand-manipulated lever on each of two sides of a driver's seat of the electric vehicle.

2. The electric vehicle activation system of claim 1, wherein manipulation of each hand-manipulated lever enables air pressure to activate a pneumatic impeller causing a hydraulic draft cycle configured to generate the start current.

3. The electric vehicle activation system of claim 2, further comprising a control circuitry electrically coupled to the hydraulic draft cycle and the generator system of the electric vehicle, the control circuitry configured to re-introduce the start current into said generator system until the latter produces a stable load resistance.

4. The electric vehicle activation system of claim 3, wherein the permanent magnet magneto generator comprises a sum of two counter-rotating permanent magnet magnetos configured to harvest angular momentum of the permanent magnet magneto generator in rotative motion.

5. The electric vehicle activation system of claim 4, wherein the hydraulic draft cycle pneumatically pressurizes hydraulic fluid while pressurizing a gear incline tilt to yield usable levels of electrical current for driving the electric vehicle.

6. The electric vehicle activation system of claim 5, further comprising a systemic oil flow configured to actuate a hydraulic impeller rotating a drive chain assembly of the electric vehicle.

7. An electric vehicle activation system comprising:

at least one hand-manipulated lever pneumatically associated with a permanent magnet magneto generator for generating a start current electrically coupled to a generator system of the electric vehicle, wherein manipulation of each hand-manipulated lever enables air pressure to activate a pneumatic impeller causing a hydraulic draft cycle configured to generate the start current.

8. The electric vehicle activation system of claim 7, further comprising a control circuitry electrically coupled to the hydraulic draft cycle and the generator system of the electric vehicle, the control circuitry configured to re-introduce the start current into said generator system until the latter produces a stable load resistance.

9. The electric vehicle activation system of claim 8, wherein the permanent magnet magneto generator comprises a sum of two counter-rotating permanent magnet magnetos configured to harvest angular momentum of the permanent magnet magneto generator in rotative motion.

10. The electric vehicle activation system of claim 9, wherein the hydraulic draft cycle pneumatically pressurizes hydraulic fluid while pressurizing a gear incline tilt to yield usable levels of electrical current for driving the electric vehicle.

11. The electric vehicle activation system of claim 10, further comprising a systemic oil flow configured to actuate a hydraulic impeller rotating a drive chain assembly of the electric vehicle.

* * * * *